United States Patent [19]

Horvath et al.

[11] Patent Number: 5,484,265

[45] Date of Patent: Jan. 16, 1996

[54] EXCESS TEMPERATURE AND STARTING SAFETY DEVICE IN PUMPS HAVING PERMANENT MAGNET COUPLINGS

[75] Inventors: Stefan Horvath, Dessau; Karl Schmidt, Waldkraiburg; Henry Schommer, Jettenbach; Gerhard Fiedler, Dessau, all of Germany

[73] Assignee: Junkalor GmbH Dessau, Dessau, Germany

[21] Appl. No.: 193,656

[22] Filed: Feb. 8, 1994

[30] Foreign Application Priority Data

Feb. 9, 1993 [DE] Germany .......................... 43 03 629.5

[51] Int. Cl.⁶ .............................. H02H 5/04; H02H 11/00
[52] U.S. Cl. ............................. 417/32; 417/63; 417/420
[58] Field of Search .................... 417/32, 43, 420

[56] References Cited

U.S. PATENT DOCUMENTS

| | | | |
|---|---|---|---|
| 2,940,395 | 6/1966 | Hill | 417/32 X |
| 4,838,763 | 6/1989 | Krämer et al. | 417/63 |
| 4,854,823 | 8/1989 | Hatting | 417/420 X |
| 5,066,200 | 11/1991 | Ooka | 417/420 X |
| 5,297,940 | 3/1994 | Buse | 417/420 X |
| 5,302,091 | 4/1994 | Horiuchi | 417/420 X |
| 5,334,004 | 8/1994 | Lefevre et al. | 417/420 |

FOREIGN PATENT DOCUMENTS

| | | |
|---|---|---|
| 0510362A1 | 10/1992 | European Pat. Off. . |
| 2251928 | 5/1974 | Germany . |
| 2315191B2 | 10/1974 | Germany . |

*Primary Examiner*—Richard E. Gluck
*Attorney, Agent, or Firm*—Herbert Dubno

[57] ABSTRACT

An excess temperature and starting safety device for a magnetic centrifugal pump, having a rotor which delivers the medium and whose shaft terminates at a gap dish, where it bears permanent magnets driven by oppositely disposed permanent magnets which are connected to the shaft of the driving motor, while attached to the inner or outer surface of the gap dish is a conductor, more particularly a piece of wire of a thermocouple whose other conductor, closing the conductor circuit, is formed by the gap dish.

9 Claims, 2 Drawing Sheets

EXCESS TEMPERATURE AND STARTING SAFETY DEVICE IN PUMPS HAVING PERMANENT MAGNET COUPLINGS

FIELD OF THE INVENTION

The invention relates to an excess temperature and starting safety device or cutoff for a magnetic centrifugal pump, having a rotor which displaces a flowable medium and whose shaft terminates at a gap dish or cup, where it bears permanent magnets driven by oppositely disposed permanent magnets which are connected to the shaft of the driving motor.

BACKGROUND OF THE INVENTION

Pumps having permanent magnet couplings are used in all cases where leakages are impermissible - i.e., in the displacement of poisonous, explosive and generally environmentally unacceptable media, and also where a high level of reliability and freedom from maintenance are to be achieved in comparison with conventional pumps having double action slide ring seals. The safe operation of such pumps therefore requires a reliable operation monitoring system free from maintenance.

It is known, for example, from the Leaflet *"Chemienorm-pumpen mit Magnetantrieb"* (Magnet Driven Standard Chemical Pumps), published by the Dickow KG, in 1991, that during operation these pumps generate in the metal antimagnetic gap-forming cup eddy currents which heat the product in the gap between the rotor and the cup. This heat is dissipated by an internal circulation or flow, so that it is impossible for the pumped medium to evaporate in this zone under normal operational conditions. If a malfunction occurs in which the pumped medium is either not supplied (dry running) or the internal circulation is interrupted or backed up (operation against a closed pressure side throttling member), at critical places the gap-forming cup becomes heated to temperatures up to several hundred degrees centigrade so that the bearings may be destroyed, the medium may become polymerized or there is a danger of explosion.

Due to the strong electromagnetic field and for structural reasons, hitherto the temperature of the gap-forming cup beneath the rotating magnets has never been monitored in such pumps. The standard temperature sensors, such as resistances or thermocouples, were disposed so far away from the heat source i.e., from the centers of the magnet elements, that as a result of the poor thermal conductivity of the antimagnetic materials of the gap-forming cup the temperatures actually occurring were not determined or monitored. In spite of the earlier temperature monitoring systems, therefore, the risks consequent on malfunction were always present.

Hitherto a starting safety device for antifriction bearing monitoring had been incorporated in such pumps in addition to the temperature sensors for the gap-forming cup. This safety device protected the cup against destruction if the outer magnets should be deflected and run eccentrically.

OBJECTS OF THE INVENTION

It is an object of the invention to provide temperature measurement at the endangered gap-forming cup in pumps having permanent magnet couplings, and to provide a starting safety device (to prevent endangering the cup upon irregular starting) directly at the heat source and the place of the gap dish endangered during starting, i.e. beneath the rotating magnets.

Another object of the invention is to provide a magnetic coupling pump and motor assembly with an improved device for monitoring safe starting thereof as well as the magnetic coupling to prevent excessive temperatures at the gap.

Still another object of the invention is to provide an improved apparatus of the type described which is free from the drawbacks of earlier systems.

SUMMARY OF THE INVENTION

This problem is solved according to the invention by attaching to the inner or outer surface of the gap-forming cup a conductor, more particularly a piece of wire of a thermocouple, whose other conductor, closing the conductor circuit, is formed by the cup itself.

Tests have shown that all temperature monitoring requirements are met if a wire is welded onto the gap-forming cup and cooperates with the material thereof to form a thermocouple. One unexpected and surprising feature in comparison with known constructions is the lower and compensatable effect of the strong magnetic field on this novel thermocouple, so that the magnetic influence on the thermocouple can be successfully suppressed by simple electronic steps. By evaluation of the thermal voltage it is possible to signal any rupture of the thermocouple formed by the wire and the gap-forming cup. Such rupture may occur either due to the eccentric running of the outer magnets or if the gap-forming cup is deformed by impermissible high internal pressure. At the same time a starting safety device is provided against mechanical damage to the outer magnets or the gap-forming cup.

Particularly advantageously at least one of the connecting places between the conductors lies below the zone of the magnets.

Also according to the invention the connecting place between the conductors is a weldment or solder Joint or some other rigid attachment. Extremely advantageously at least one of the connecting places between the conductors lies immediately adjacent the zone of the magnets.

More particularly, a pump and motor apparatus according to the invention can comprise:

a motor having a drive shaft;

a pump having a rotor shaft;

a permanent magnet coupling between the shafts and include:

an annular array of permanent magnets on the motor shaft, an array of permanent magnets on the rotor shaft juxtaposed radially with the array of permanent magnets on the motor shaft across an annular gap whereby the rotor shaft is magnetically coupled with the motor shaft, and a stationary gap-forming cup in the annular gap between the array and composed of an antimagnetic metallic material; and an excess temperature and starting-safety monitoring device which includes a thermocouple having one conductor formed by the cup and another conductor affixed to the cup for monitoring temperature in the gap and eccentric running at the gap.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
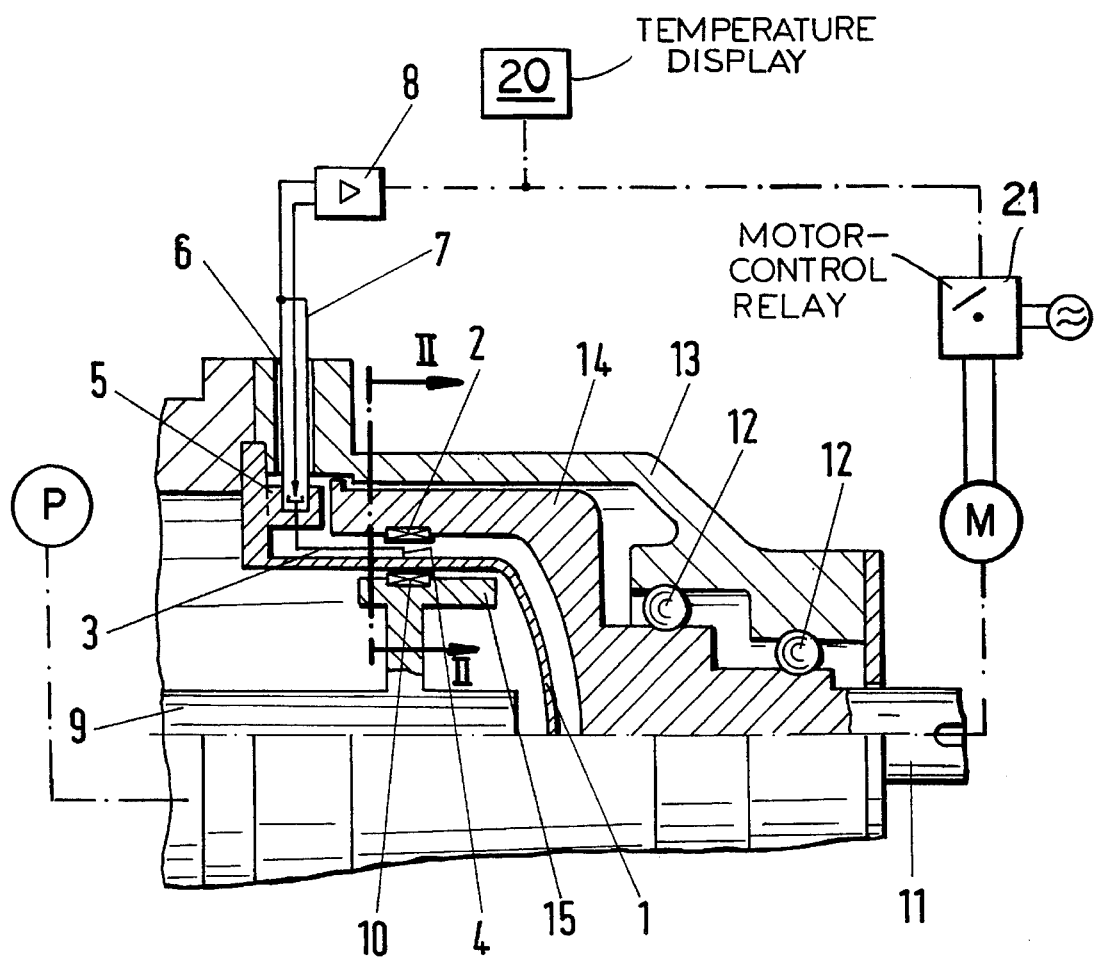
FIG. 1 is a diagrammatic cross section of the region of the permanent magnet coupling of a pumping apparatus according to the invention.
Figure 2:
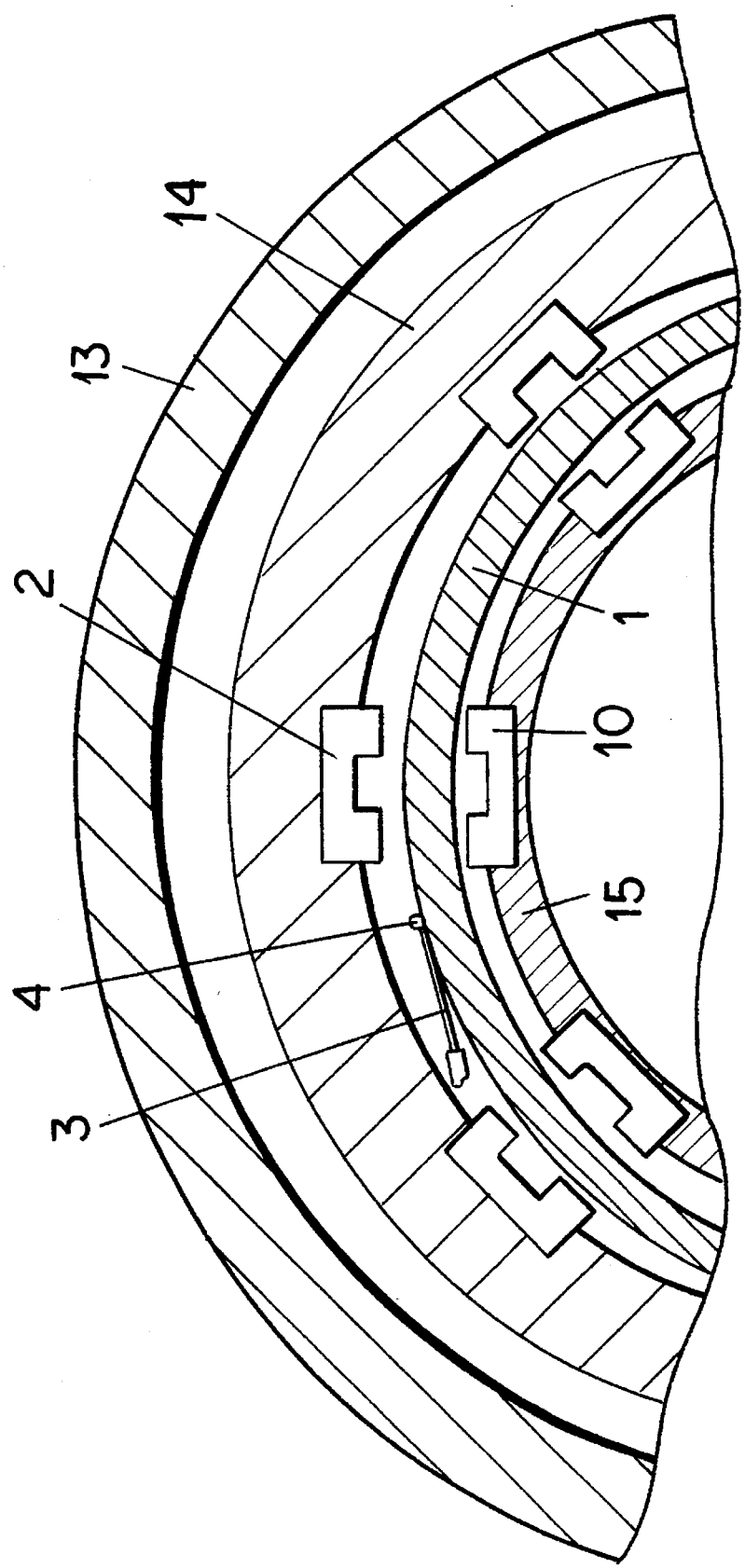
FIG. 2 is a cross section taken along the line II—II of FIG. 1.

An electric driving motor is attached to a shaft 11 to drive a pump P (only partially shown) via a magnetic connection. To this end the shaft 11 is rotatably mounted via bearings 12 in a pump casing 13 and widens out into a unitary dished portion 14 externally enclosing a fixed gap-forming cup or dish 1.

Shaft 9 of the pump rotor is coaxially mounted inside the gap or dish cup i and widen out into a cylindrical portion 15 disposed adjacent the inside of the gap dish or cup 1. Permanent magnets 10 are attached to the cylindrical outside of the cylindrical portion 15 adjacent the gap dish 1 and are disposed opposite permanent magnets 2 attached to the inside of the dishshaped portion 14.

Inwardly of the annular array of angularly equispaced outer magnets 2 one end of a wire 3 is rigidly attached, preferably by a weld, to the surface of the gap dish 1.

The wire 3 extends insulated from the gap dish 1 to a connecting brush 5 whose external pole is made of the material of the gap dish. The end of the wire 3 cooperates with the material of the gap dish to form a thermocouple 4. The measured thermal voltage is passed on through radial opening 6 in the pump casing 13 by means of a plug 7 to an amplifier 8. The amplifier 8 has a device which indicates a rupture of the thermocouple and in this case serves as a pump start-up safety device. The value of the thermocouple voltage is a measurement of pump malfunction as a result of thermal overload. The temperature can be indicated on a display 20 and detection of rupture by a relay 21 can cut off the motor M. The cup I can be composed of copper while the wire is CONSTANTAN when the thermocouple formed at 4 is a Cu-CONSTANTAN couple.

We claim:

1. A pump apparatus comprising:

a motor having a drive shaft;

a pump having a rotor shaft;

a permanent magnet coupling between said shafts and include:

an annular array of permanent magnets on said motor shaft, an array of permanent magnets on said rotor shaft juxtaposed radially with the array of permanent magnets on said motor shaft across an annular gap whereby said rotor shaft is magnetically coupled with said motor shaft, and a stationary gap-forming cup in said annular gap between said arrays and composed of an antimagnetic metallic material; and an excess temperature and starting-safety monitoring device which includes a thermocouple having one conductor formed by said cup and another conductor affixed to said cup for monitoring temperature in said gap and eccentric running at said gap.

2. The apparatus defined in claim 1 wherein said other conductor is a wire is connected to said cup at a location inwardly of one said arrays.

3. The apparatus defined in claim 1 wherein said other conductor is a wire connected to said cup at a weld junction.

4. The apparatus defined in claim 1 wherein said other conductor is a wire connected to said cup at a solder junction.

5. The apparatus defined in claim 1, further comprising means forming a rigid connection between said other conductor and said cup.

6. The apparatus defined in claim 1 wherein said other conductor is a wire joined to said cup at a connecting location immediately adjacent a zone of said arrays.

7. The apparatus defined in claim 1 wherein said arrays lie in a common plane perpendicular to a common axis of said shafts.

8. The apparatus defined in claim 7 wherein said motor shaft is formed with a dished portion carrying said array of permanent magnets of said motor shaft and disposed outwardly of said cup, said rotor shaft having a disk provided with a rim carrying said array of permanent magnets on said rotor shaft inwardly of said cup, said cup being provided with a connector between said thermocouple and an amplifier.

9. The apparatus defined in claim 8 further comprising a casing, said motor shaft being journaled on bearings in said casing, said casing having a feedthrough for electrical leads connected to said conductors and to said amplifier.

\* \* \* \* \*